United States Patent [19]

Shibata et al.

[11] Patent Number: 5,349,488
[45] Date of Patent: Sep. 20, 1994

[54] APPARATUS FOR SELECTING AN OPERATING MODE OF A RECORDING AND REPRODUCING SYSTEM FOR A CASSETTE TAPE RECORDER

[75] Inventors: Masanori Shibata; Shigeo Umetsu; Shinichi Suzuki; Michihiro Sato; Kazuhiro Saito; Hiroyuki Akama, all of Yamagata, Japan

[73] Assignees: Pioneer Electronic Corporation, Tokyo; Tohoku Pioneer Electronic Corporation, Tendo, both of Japan

[21] Appl. No.: 89,297

[22] Filed: Jul. 7, 1993

[30] Foreign Application Priority Data

Jul. 10, 1992 [JP] Japan .................. 4-207596

[51] Int. Cl.$^5$ ............................. G11B 21/22
[52] U.S. Cl. ...................... 360/105; 360/96.3
[58] Field of Search ............ 360/105, 137, 96.3, 360/96.1–96.2

[56] References Cited

U.S. PATENT DOCUMENTS

| | | | |
|---|---|---|---|
| 4,748,521 | 5/1988 | Osawa et al. | 360/137 |
| 4,757,405 | 7/1988 | Laudus | 360/96.3 |
| 4,896,234 | 1/1990 | Watanabe et al. | 360/137 |
| 5,018,401 | 5/1991 | Ida et al. | 360/96.3 |
| 5,144,507 | 9/1992 | Kurita | 360/96.3 |
| 5,260,844 | 11/1993 | Koga et al. | 360/137 |

Primary Examiner—A. J. Heinz
Assistant Examiner—Brian E. Miller
Attorney, Agent, or Firm—Nikaido, Marmelstein, Murray & Oram

[57] ABSTRACT

A mode control ring having cams for operating various devices in a cassette tape recorder is rotatably mounted on a base plate. A normal pinch device and a reverse pinch device are mounted on the base plate. Each of the pinch devices comprises a capstan, a pinch roller provided on a swing lever so as to be engaged with the capstan, and an idler provided to be engaged with a reel gear. A power transmitting devices is provided for transmitting a driving power from a motor to each capstan. The normal pinch device, reverse pinch device are disposed along the circumference of the mode control ring, and each swing lever is arranged so as to be moved in the radial direction of the mode control ring. Selective operation of these devices is controlled by the rotatably mounted mode control ring, which has various cams formed on its inner peripheral surface, on its outer surface, and as grooves therein, which are engaged with cam following members of the devices.

4 Claims, 17 Drawing Sheets

APPARATUS FOR SELECTING AN OPERATING MODE OF A RECORDING AND REPRODUCING SYSTEM FOR A CASSETTE TAPE RECORDER

BACKGROUND OF THE INVENTION

The present invention relates to a device for selecting an operating mode of a recording and reproducing system in a tape recorder using a cassette tape.

The operation mode of the system, such as a reproducing, recording, fast-forward and rewind mode is set by operating buttons provided on an operation panel of the tape recorder. In accordance with the selected operating mode, positions of a magnetic head and a pinch roller and the rotating direction of reel gears of the system are controlled.

Japanese Utility Model Publication No. 62-32355 discloses an operating mode changing system for a cassette tape recorder where a position changing mechanism is provided for moving a head base to a predetermined position so as to change an operating mode of a cassette tape. FIG. 1 shows the system. The system comprises a chassis b provided with a pair of reel bases $c_1$ and $c_2$ rotatably mounted thereon to be engaged with a supply reel and a takeup reel of a magnetic tape in a cassette (not shown), respectively. A head base a having an erase head $a_1$ and a reproduction head $a_2$ is provided on the chassis b. The head base a has slits $a_3$ and $a_4$ which are slidably engaged with pins $b_1$ and $b_2$ secured to the chassis b. A disc cam e having a cam groove $e_1$ is rotatably mounted on the chassis b by a shaft $e_2$.

A supporting lever $c_6$ is pivotally mounted on the chassis b about a pivot $c_5$ at a central portion thereof. The lever $c_6$ has a pinch roller $c_4$ rotatably mounted on an end portion thereof cooperating with a capstan $c_3$ rotatably mounted on the chassis b.

A control lever d is pivotally mounted on a pivot $d_1$ secured to the chassis b. The lever d is provided with an engaging pin $d_2$ at an end thereof to be engaged with a slit $a_5$ formed on the base a, and a control pin $d_3$ at the other end to be slidably engaged with the cam groove $e_1$ of the disc cam e. A spring $d_4$ is provided between the lever d and the base a so as to urge the base a in the direction shown by an arrow A.

A control lever f is pivotally mounted on a pivot $f_2$ secured to the chassis b. The lever f is provided with a control pin $f_1$ at an end thereof to be slidably engaged with the cam groove $e_1$ of the disc cam e. The ever f is connected with a control plate g at the other end.

The plate g has slits $g_1$ and $g_2$ to be slidably engaged with pins $b_3$ and $b_4$ secured to the chassis b so that the plate is moved in the direction shown by an arrow B in accordance with the lever f. The plate g is provided with a flange portion $g_3$ having a notch $g_4$. The notch $g_4$ is adapted to be engaged with the lever $c_6$ at the other end portion. A spring $g_6$ is provided between a projection $g_5$ of the plate g and the lever $c_6$ so as to urge the lever $c_6$ in the counterclockwise direction about the pivot $c_5$.

The head base a and the control plate g are moved by the operation of the levers d and f in dependency on the configuration of the cam groove $e_1$ for controlling the positions of the heads $c_1$ and $c_2$ and the pinch roller $c_4$.

The system of FIG. 1 shows a position in stop, rewind and fast-forward modes. The head base a is located at a retracted position so that heads $a_1$ and $a_2$ are disengaged from the tape. The end of the supporting lever $c_6$ is engaged with the notch $g_4$ of the plate g so that the pinch roller $c_4$ is separated from the capstan $c_3$. In cue, pause and play modes, the base a is moved in the direction A. Thus, the heads $c_1$ and $c_2$ are engaged with the tape and the lever $c_6$ is disengaged from the notch $g_4$ so that the lever $c_6$ is rotated in the counterclockwise direction by the spring $g_6$. The pinch roller $c_4$ is abutted on the capstan $c_3$ so that the tape is transmitted passing between the capstan and pinch roller.

In the system, a rotating power of the disc cam e is transmitted to the head base a and the supporting lever $c_6$ with control levers d and f for moving the base plate and pivoting the supporting lever. Therefore, the system is complicated in construction. It is difficult to reduce the size of a car stereo or a portable tape recorder where a number of parts are assembled in a smaller space. Furthermore, the rotating power of the disc cam e is not efficiently transmitted to the base a and lever $c_6$ because there is a power loss in the transmitting structure.

In fast-forward and rewind modes, in order to rotate the reel bases $c_1$ and $c_2$ at a high speed, it is necessary to change the engagement of the gears by an idler gear. A mechanism for changing the position of the idler gear corresponding to the base is provided independent of the position changing mechanism of the base. Accordingly, the structure is further complicated, and it is necessary to set a timing for operating both mechanisms.

SUMMARY OF THE INVENTION

An object of the present invention is to provide an operating mode selecting device for a tape recorder where each element of the recorder is controlled in a good timing in accordance with the selected mode with a simple structure.

According to the present invention, there is provided an apparatus for selecting an operating mode of a cassette tape recorder comprising a base plate, a magnetic head provided on a supporting plate which is movably mounted on the base plate, a normal reel gear and a reverse reel gear rotatably mounted on the base plate, respectively, a normal pinch device mounted on the base plate and comprising a normal capstan, a normal pinch roller provided on a normal swing lever so as to be engaged with the capstan, and a normal idler provided to be engaged with the normal reel gear, a reverse pinch device mounted on the base plate and comprising a reverse capstan, a reverse pinch roller provided on a reverse swing lever so as to be engaged with the reverse capstan, and a reverse idler provided to be engaged with the reverse reel gear, a power transmitting device for transmitting a driving power from motor to the normal capstan and reverse capstan, an idler gear rotatably mounted on a movable plate movably mounted on the base plate, and a mode control ring rotatably mounted on the base plate.

The mode control ring has a head shifting cam for shifting the supporting plate between a head operative position and a head inoperative position, a normal pinch cam for shifting the normal swing lever so as to engage the normal pinch roller with the normal capstan, a reverse pinch cam for shifting the reverse swing lever so as to engage the reverse pinch roller with the reverse capstan, a normal idler cam for engaging the normal idler with the normal reel gear to drive it for normal playing, a reverse idler cam for engaging the reverse idler with the reverse reel gear to drive it for reverse playing, and a fast-forward cam for shifting the movable plate so as to engage the idler with one of the normal reel gear and the reverse reel gear.

The normal pinch device, reverse pinch device are disposed along the circumference of the mode control ring, and the supporting plate, normal swing lever, reverse swing lever, and movable plate are arranged so as to be moved in radial directions of the mode control ring.

The magnetic head, normal pinch device, and reverse pinch device are disposed on one side of the mode control ring, and the power transmission device is disposed on the other side of the mode control ring.

The other objects and features of this invention will become understood from the following description with reference to the accompanying drawings.

DETAILED DESCRIPTION OF THE PREFERRED EMBODIMENT

Figure 1:
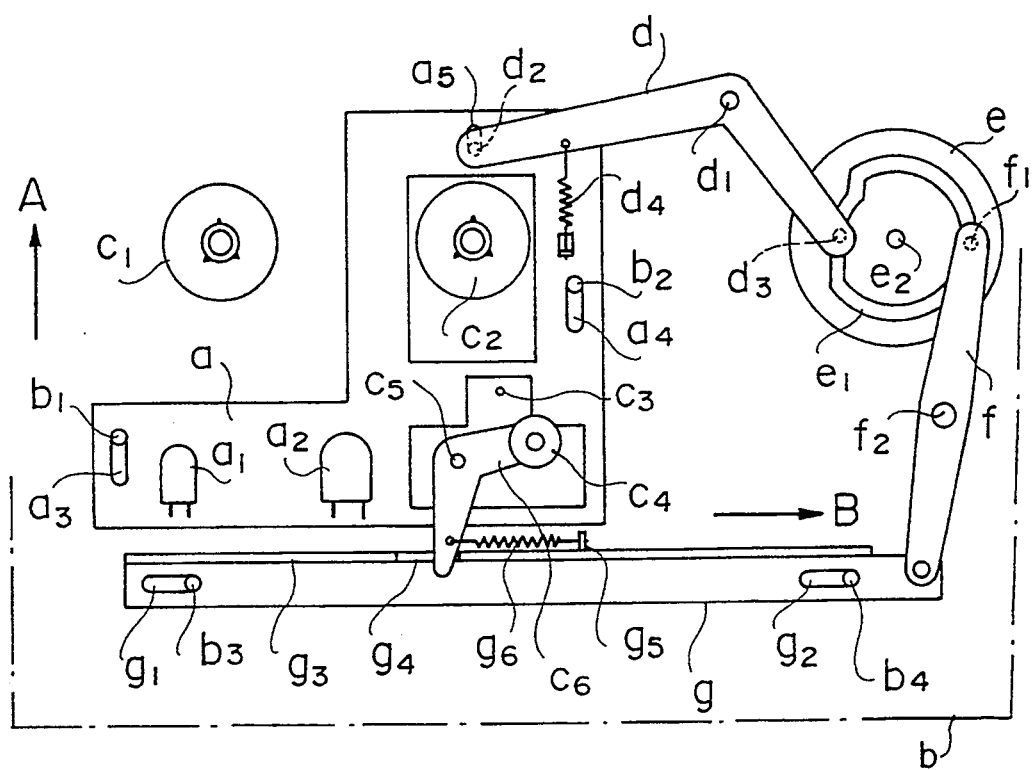
FIG. 1 is a schematic plan view showing a conventional mode changing system.
Figure 2:
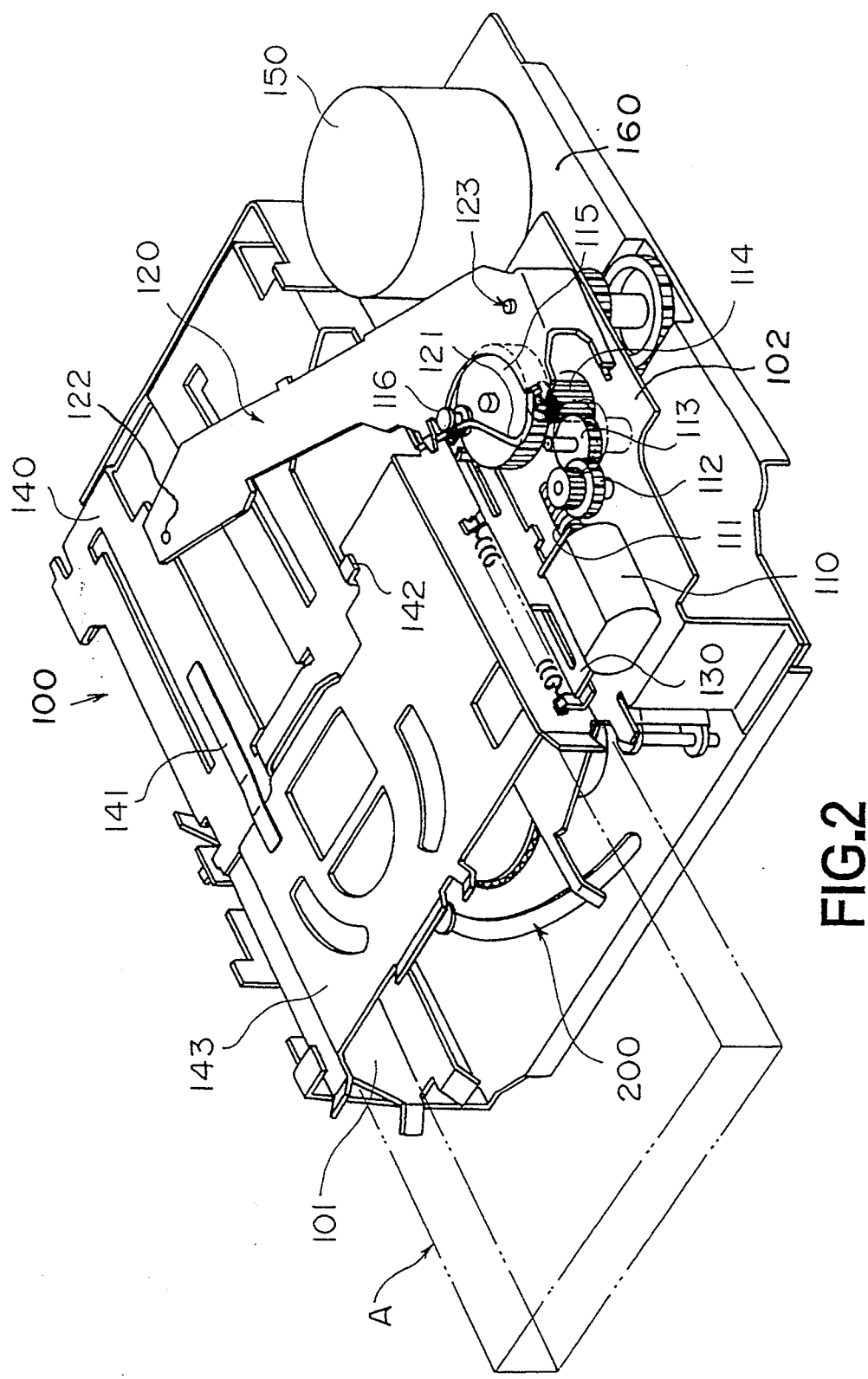
FIG. 2 is a perspective view showing a recording and reproducing system for a cassette tape recorder according to the present invention.

Referring to FIG. 2 showing a recording and reproducing system of a cassette tape recorder to which the present invention is applied, a cassette holder 100 comprises an inclining member 140, a loading member 143 engaged with the member 140 through an elastic member 141 and a hook 142, and a base plate 160. The holder 100 has an inlet 101 from which a cassette half A is inserted into the holder.

A lever 120 having a pin 122 is pivotally mounted on a pivot 123 secured to a frame portion 102. The lever 120 is provided for loading and ejecting the cassette half A in and from the holder 100. A motor 110 for operating the lever 120 has a worm gear 111 formed on a rotating shaft thereof and engaged with a worm wheel 112 rotatably mounted on the frame portion 102. The worm wheel 112 is engaged with a lever drive gear 115 through intermediate gears 113 and 114. The gear 115 is provided with a pin 116 on which an end of a spring 121 is abutted. A slider plate 130 having a spring is secured to the lever 120. An unlock device (not shown) is provided on an end portion of the slider plate 130.

When the cassette half A is inserted into the holder 100 through the inlet 101, the end of the cassette half A is engaged with the pin 122 to push the pin inwardly, so that the lever 120 is rotated about the pivot 123. The slider plate 130 is simultaneously moved inwardly. A lever switch (not shown) is turned on to start the operation of the motor 110.

When the cassette half A is mounted in the holder 100, the slide plate 130 operates the unlock device (not shown) so as to release the inclining member 140. The inclining member 140 is downwardly inclined to push the loading member 143. Thus, the cassette half A is loaded to a playing position.

Figure 3:
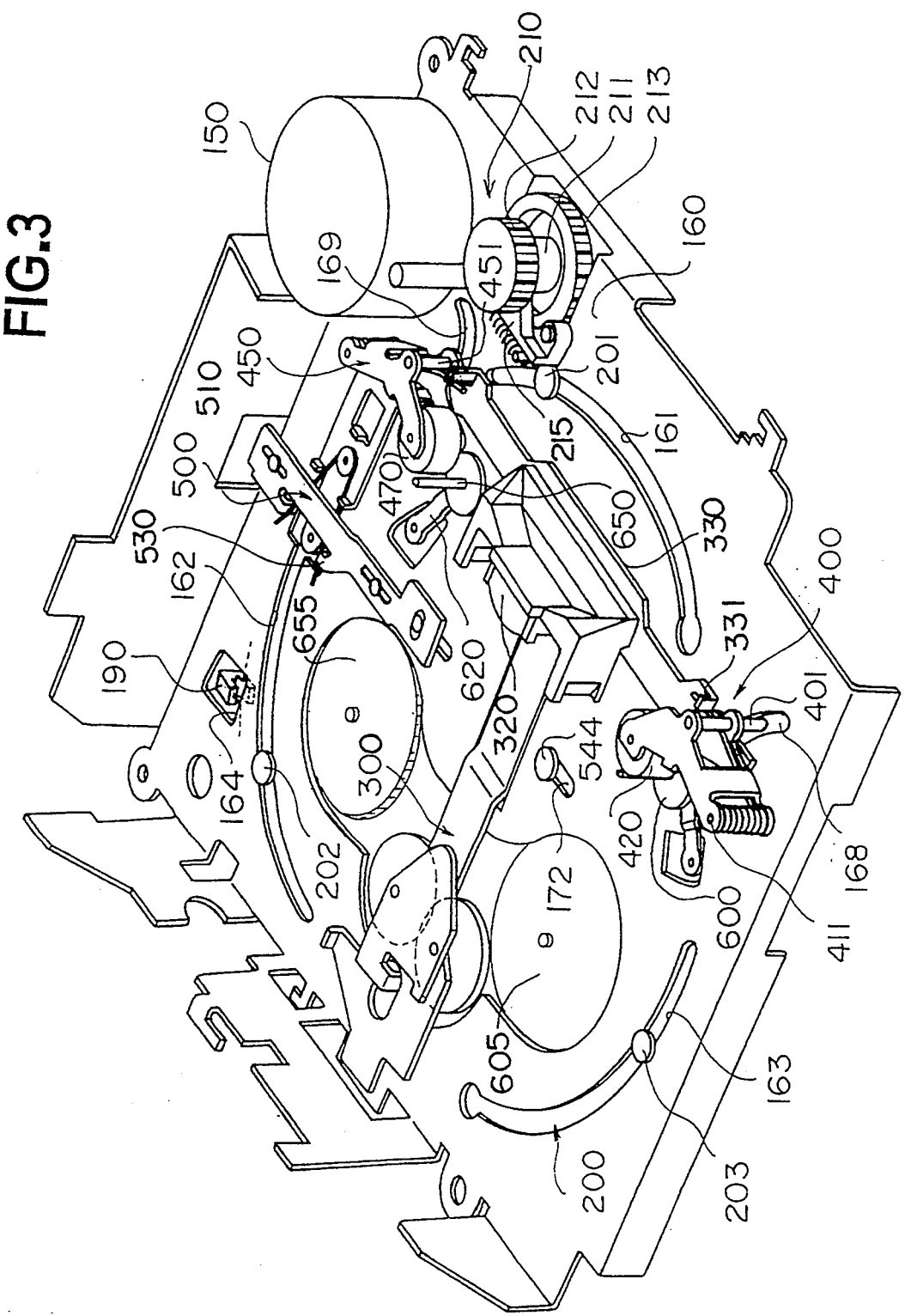
FIG. 3 is a perspective view showing a main part of the system.

Referring to FIG. 3 showing a main part of the system mounted on the base plate 160 of the holder 100, the system comprises a main motor 150, a magnetic head 320, a head moving device 300 for controlling the position of the magnetic head 320, a reverse pinch device 400, a normal pinch device 450, capstans 600 and 650, and an idler moving device 500. A mode control ring 200 is provided under the base plate 160.

A gear device 210 is provided for operating the mode control ring 200. The gear device 210 comprises a gear 212 engaged with the intermediate gear 114 (FIG. 2) and a gear 213 coaxially mounted on the gear 212 through a shaft 211.

Figure 4:
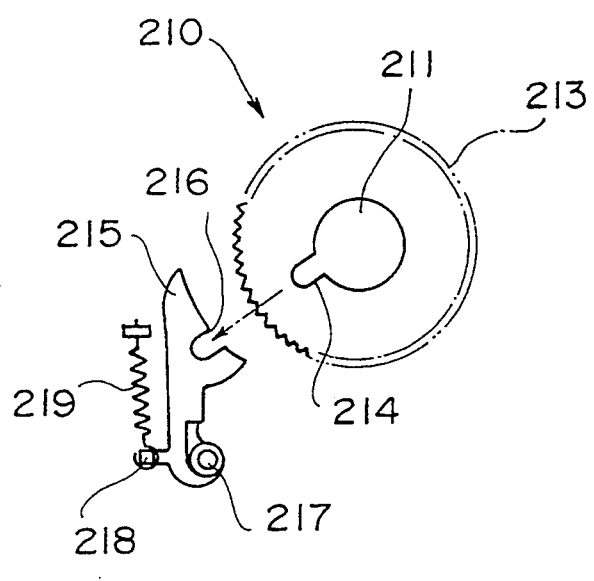
FIG. 4 schematically shows a drive gear.

Referring to FIG. 4, the gear device 210 is further provided with a cam lever 215 pivotally mounted on a shaft 217 provided on the base plate 160. The cam lever has a notch 216 and a spring 219 provided between a lug 218 of the lever and the base plate 160. Thus, the lever 215 is urged in the clockwise direction in FIG. 4. The shaft 211 is provided with a projection 214 engaged with the notch 216 of the lever 215.

When the power of the motor 110 is transmitted to the gear device 210, the cam lever 215 is pivoted in the counterclockwise direction against the spring 219.

Figure 6:
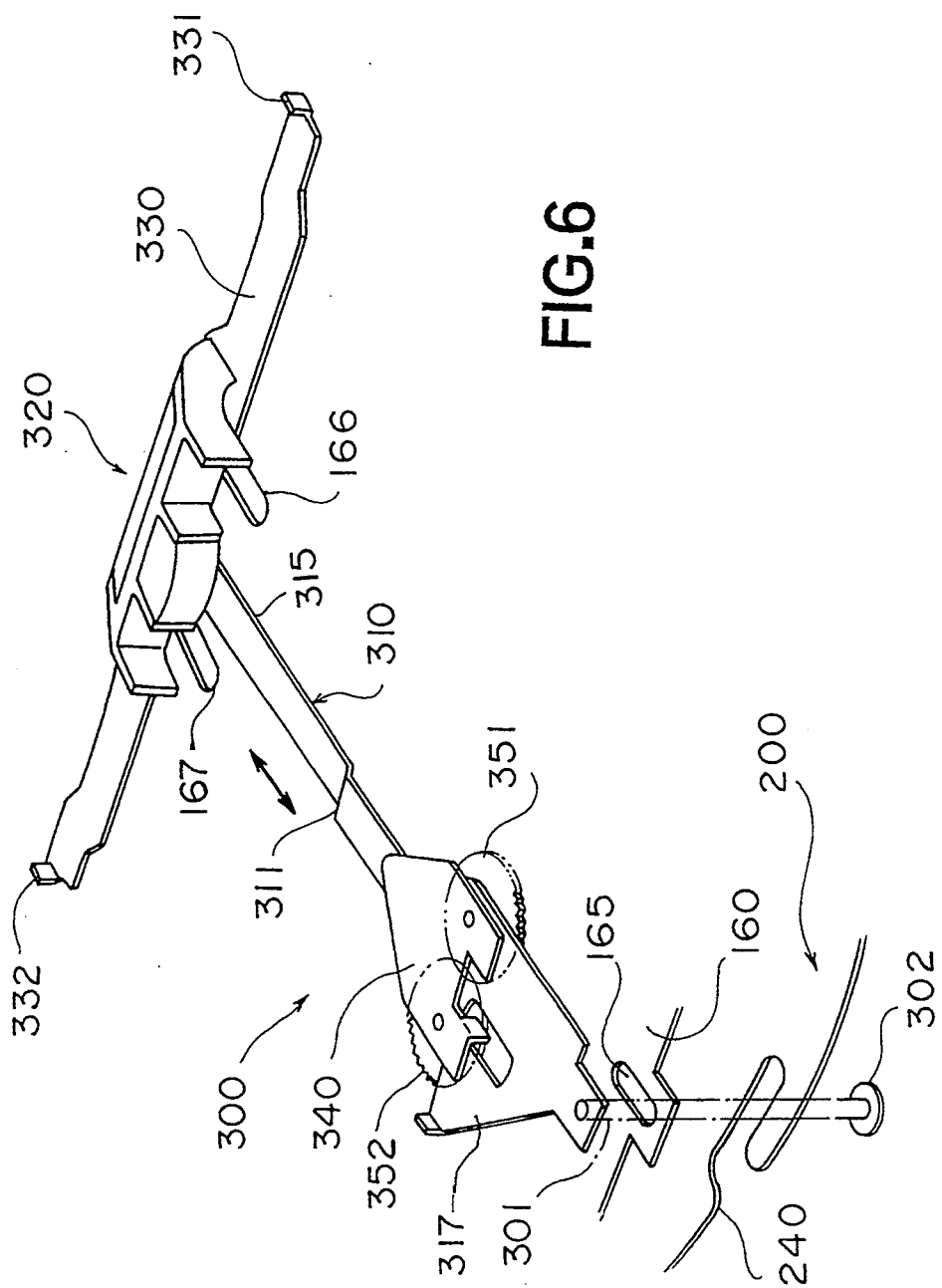
FIG. 6 is a perspective view showing a head moving device.

Referring to FIG. 6, the magnetic head 320 is mounted on the head moving device 300. The head moving device 300 comprises a supporting plate 330 on which the head 320 is mounted, and an operating plate 310 secured to or integrated with the supporting plate 330, perpendicular to the plate 310.

The supporting plate 330 has a pair of lugs 331 and 332 formed on opposite end portions thereof. A pair of guide pins (not shown) are provided under the plate 330, slidably engaged with slits 166 and 167 formed on the base plate 160.

The operating plate 310 has an elongated plate portion 315 having a step 311 and a base portion 317. At an end of the base portion 317, a pin 301 having a head 302 is provided downwardly for operating the device 300. A part of the plate portion 315 between the step 311 and the head 320 is embedded in a recess or a notch formed on the base plate 160 so as to make the surface of the plate portion flush with the base plate. A slide plate 340 is slidably mounted on the base portion 317.

Figure 7:
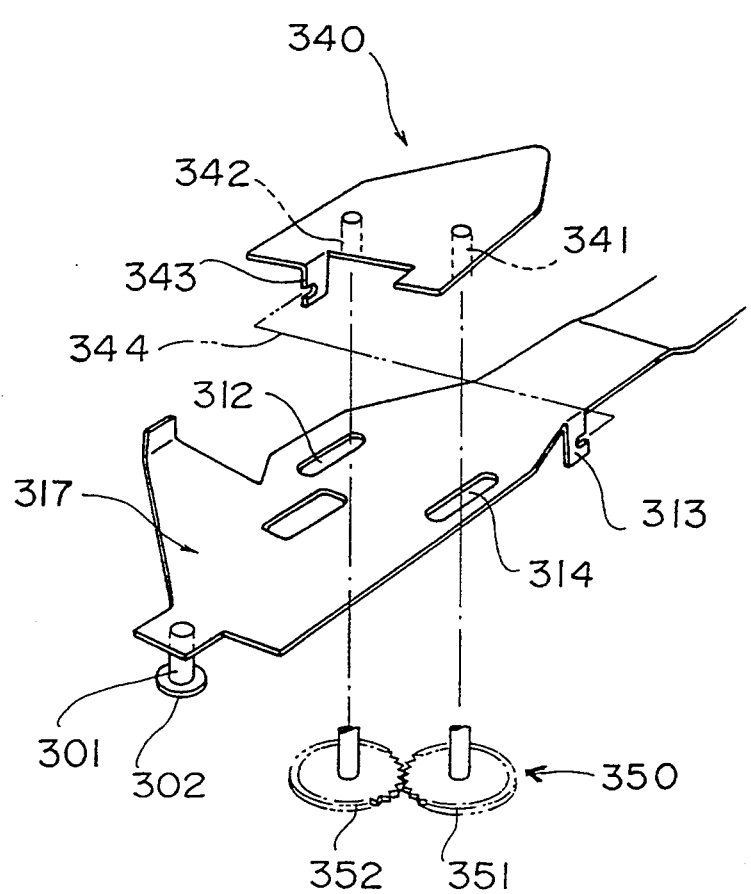
FIG. 7 is an enlarged exploded perspective view showing a tension device.

Referring to FIG. 7, the base portion 317 has a pair of slits 312 and 314. The slide plate 340 has a pair of pins 341 and 342 slidably engaged with the slits 314 and 312, respectively. A pair of gears 351 and 352 are rotatably mounted on the pins 341 and 342, interposing the base portion 317. The gears 351 and 352 compose a tension device 350 for a magnetic tape, which will be described hereinafter. The base portion 317 has a hook 313 and the slide plate 340 has a hook 343. A spring 344 is provided between the hooks 313 and 343 so as to urge the slide plate toward the head.

As shown in FIG. 3, the reverse pinch device 400 is provided adjacent to the lug 331 of the supporting plate 330 and the normal pinch device 450 is provided adjacent to the lug 332 of the supporting plate.

Figure 8:
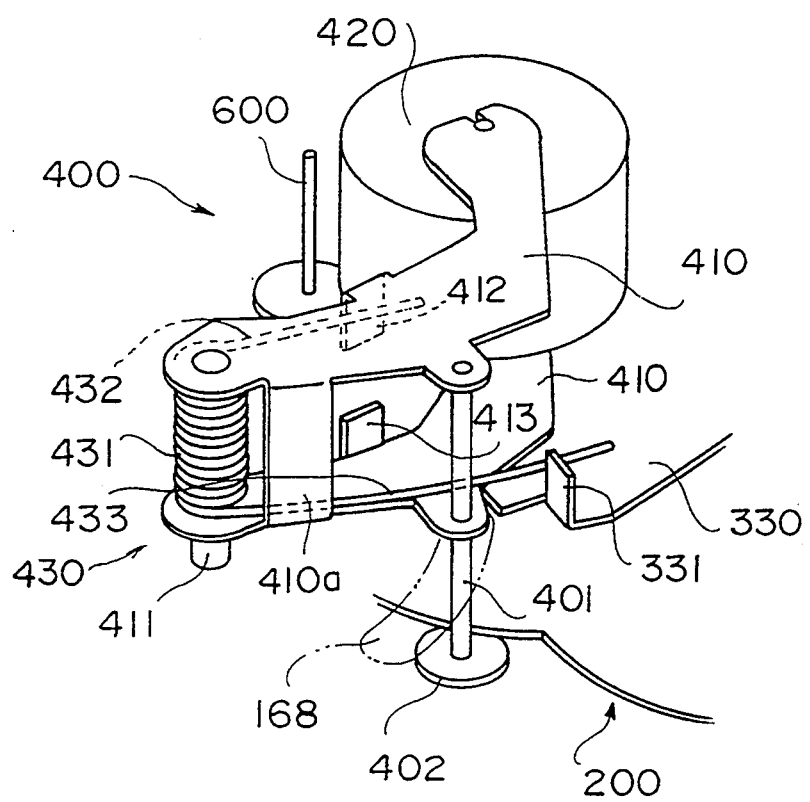
FIG. 8 is an enlarged perspective view showing a reverse pinch device.

Referring to FIG. 8, the reverse pinch device 400 comprises upper and lower swing levers 410 integrated by a frame 410a and pivotally mounted on a shaft 411 secured to the base plate 160. A reverse pinch roller 420 is rotatably mounted between the swing levers 410 at an end portion thereof. A spring 430 is provided around the shaft 411 between the levers. A pin 401 having a head 402 is secured to the swing levers 410 and downwardly projected from the lower lever. An end portion 432 extended from a body 431 of the spring 430 is engaged with a lug 412 of the upper lever 410 and the other end 433 of the spring body is extended on the lower lever 410 and engaged with the lug 331 of the supporting plate 330 of the head moving device 300. A lug 413 is formed on the lower lever for preventing the end 433 from removing from the lever.

Figure 10:
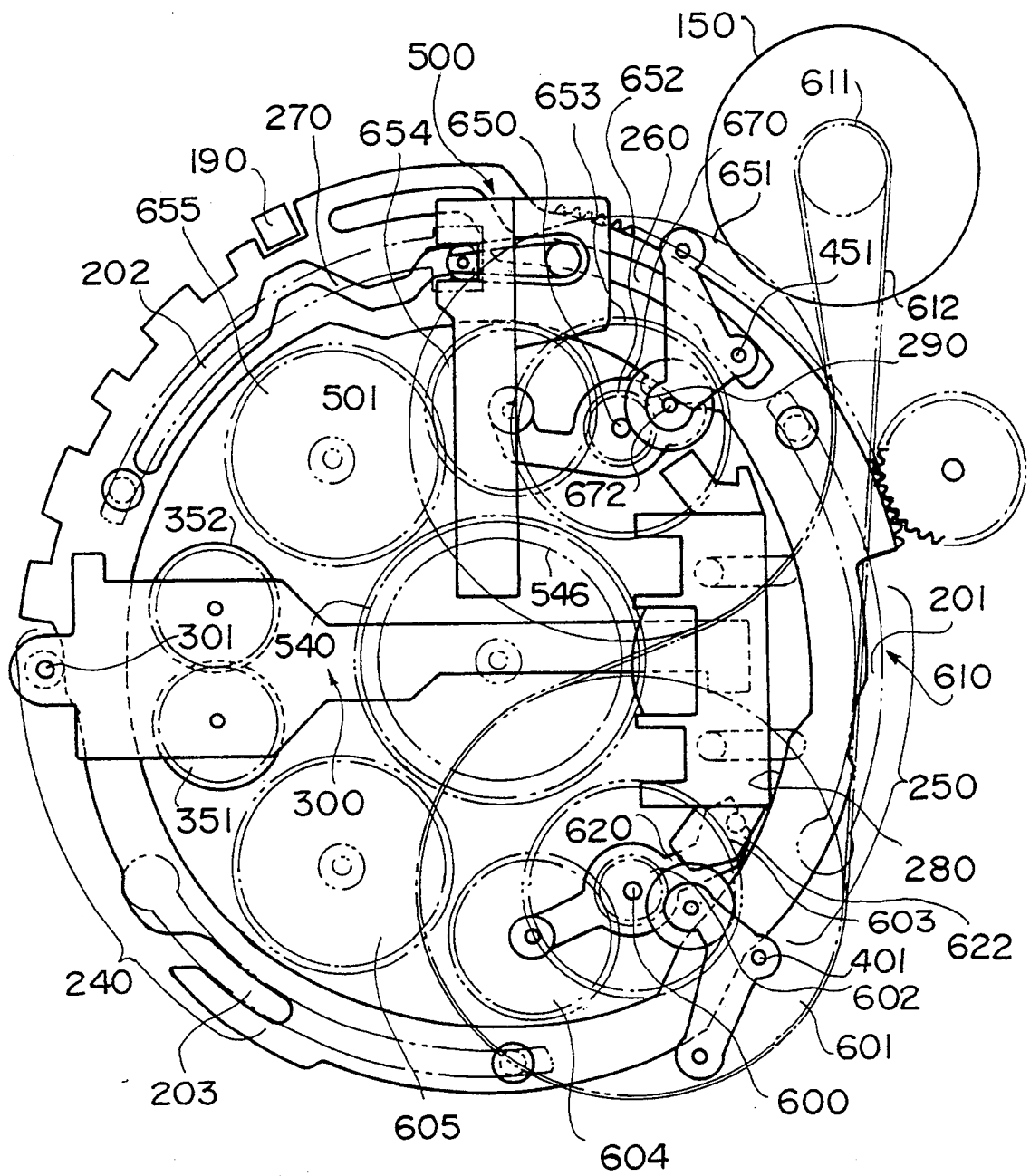
FIG. 10 is a plan view mainly showing a power transmitting device.
Figure 11:
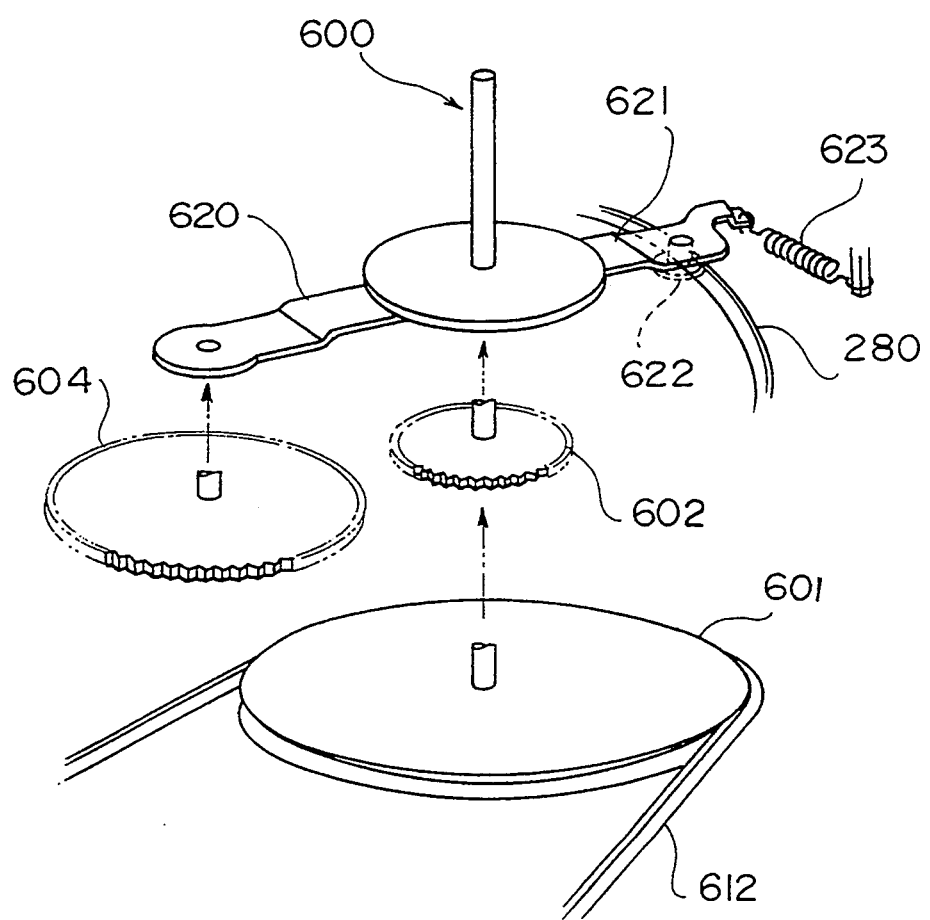
FIG. 11 is an enlarged exploded perspective view showing a capstan.

A capstan 600 is rotatably mounted on the base plate 160 corresponding to the pinch roller 420. Referring to FIG. 11, a pulley 601 is securely mounted on the capstan 600 under a base wheel thereof. In order to transmit the power of the main motor 150 to the capstan, a belt 612 engaged with a pulley 611 of the main motor 150 (FIG. 10) is engaged with the pulley 601. A reverse gear 602 and a rewind gear 603 are coaxially mounted on the capstan 600.

A swing lever 620 is pivotally mounted on the base wheel of the capstan 600. The swing lever 620 has a reverse idler gear 604 rotatably mounted on an end portion thereof, and a step portion 621 provided on the other end. A pin 622 is secured to the step portion 621 opposite to the gear 604. The idler gear 604 is engaged with the reverse gear 602. The end of the step portion 621 is engaged with the lower portion of the base plate 160. A spring 623 is provided between the end of the step portion 621 and the base plate 160.

Figure 9:
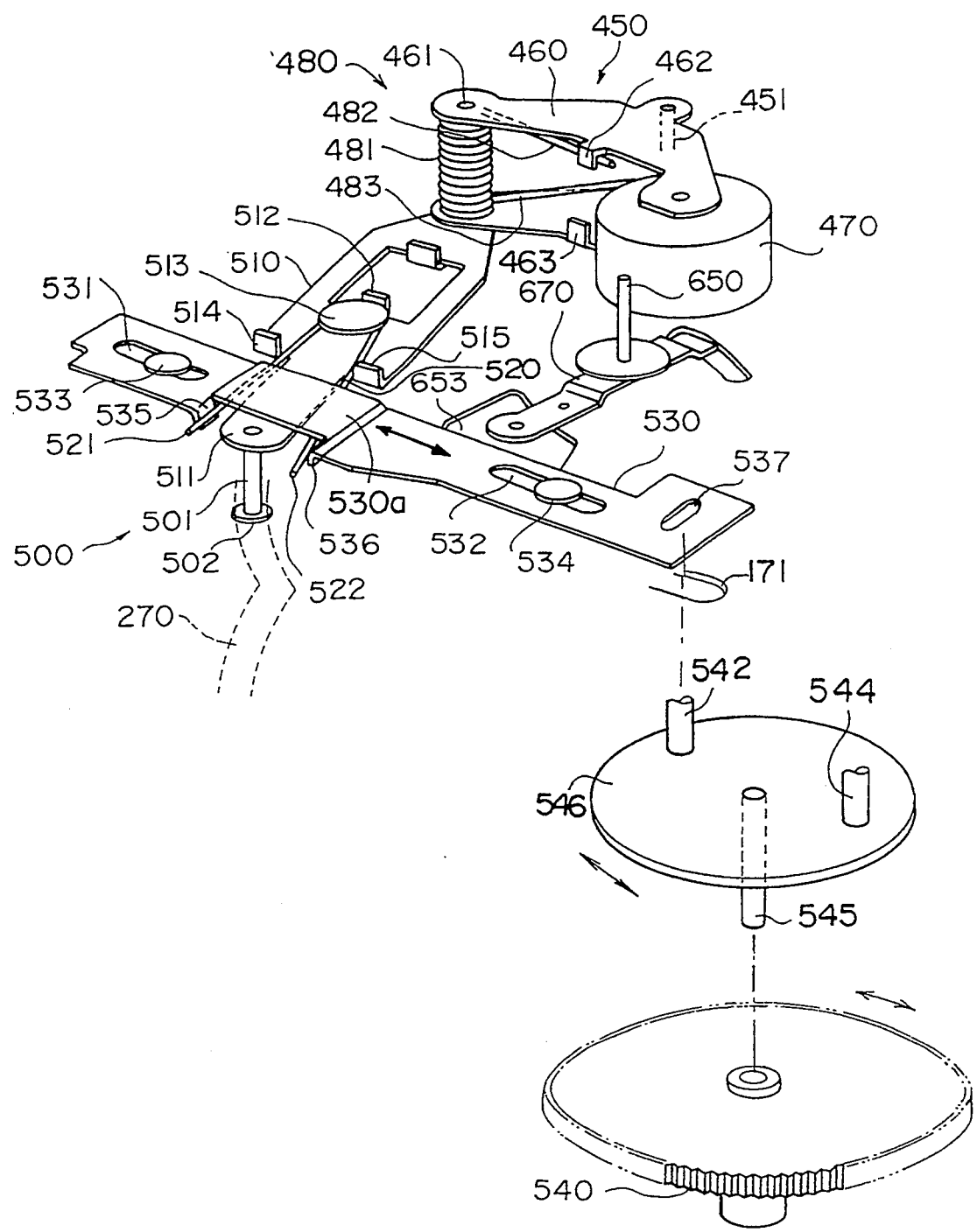
FIG. 9 is an exploded perspective view showing a normal pinch device with an idler gear.

Referring to FIG. 9, the normal pinch device 450 has approximately the same construction as the reverse pinch device 400. Namely, the normal pinch device 450 comprises upper and lower swing levers 460 pivotally mounted on a shaft 461, a normal pinch roller 470 rotatably mounted between the levers 460, a spring 480 having a body 481 provided on the shaft 461 between the levers, and a pin 451 secured to the levers 460 and downwardly projected from the lower lever. A spring end 482 extended from the body 481 is engaged with a lug 462 of the upper lever 460 and the other spring end 483 is extended on the lower lever 460 and engaged with the lug 332 (FIG. 3). A lug 463 is formed on the lower lever for preventing the end 483 from removing from the lever.

A capstan 650 is provided corresponding to the pinch roller 470. A swing lever 670 pivotally mounted on a base wheel of the capstan 650 has the same construction as the lever 620 (FIG. 11). The swing lever 670 has a normal idler gear 654 and a pin 672 (FIG. 10). As shown in FIG. 10, the capstan 650 is coaxially provided with a pulley 651 engaged with the belt 612, a normal gear 652 engaged with the normal idler gear 654, and a fast-forward gear 653.

Figure 13:
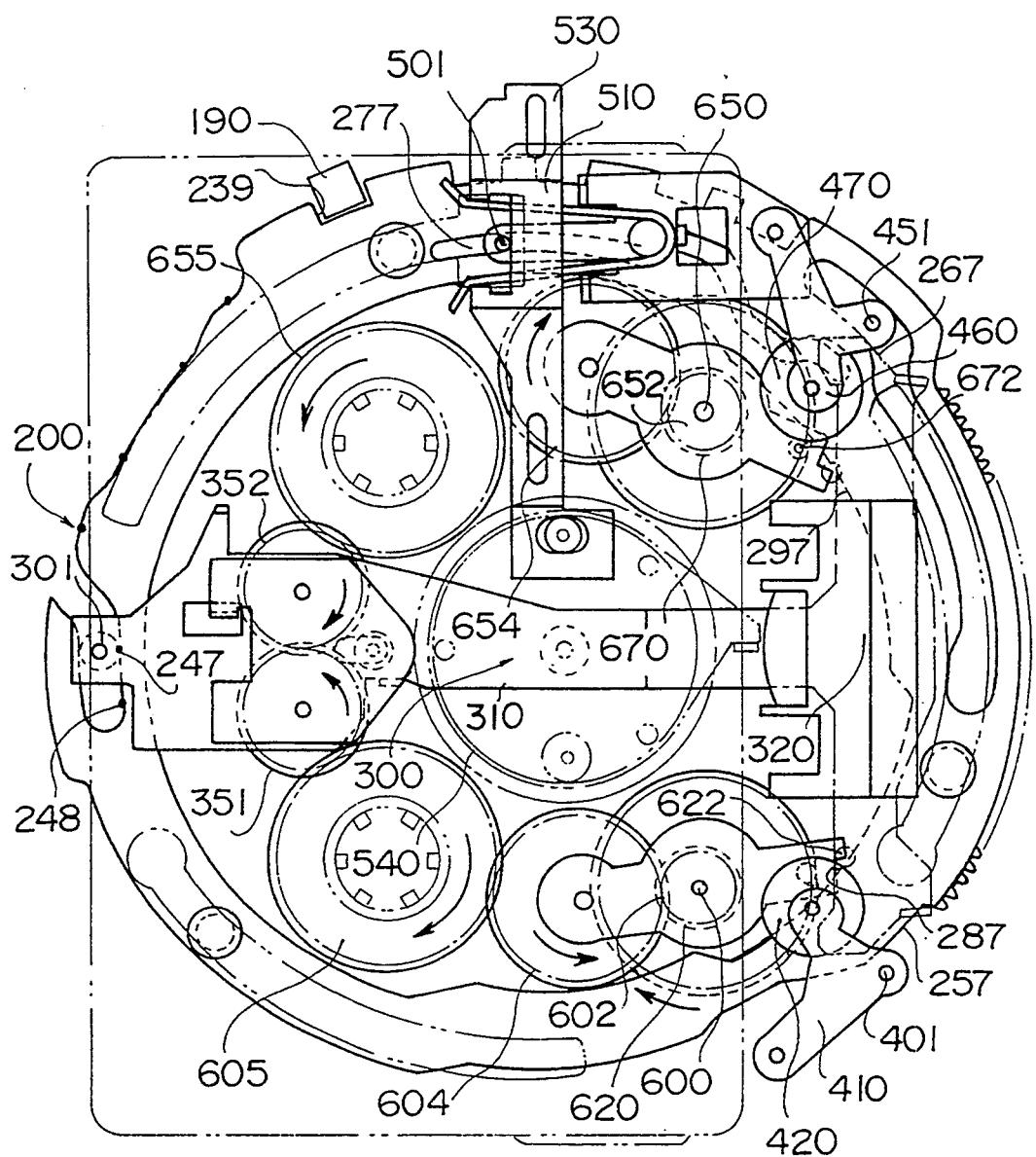
FIG. 13 shows an explanatory plan view of the main part in a release mode.

As shown in FIG. 13, the reverse idler gear 604 engaged with the reverse gear 602 is engaged with a reverse reel gear 605 in accordance with the operation of the swing lever 620 (FIG. 11). The reverse reel gear 605 is engaged with the gear 351 of the tension device 350. The normal idler gear 654 engaged with the normal gear 652 is engaged with a normal reel gear 655 in accordance with the operation of the swing lever 670 (FIG. 9). The reel gear 655 is engaged with the gear 352.

Referring to FIG. 9, the idler moving device 500 is provided adjacent to the normal pinch device 450 for moving an idler gear 540. The idler moving device 500 comprises a swing lever 510 pivotally mounted on the shaft 461 of the normal pinch device 450, an extension 511 projected from the swing lever 510 opposite to the shaft 461, and a pin 501 having a head 502 secured to an end of the extension 511. The swing lever 510 is provided with a lug 512 and a stud 513 secured adjacent to the lug. A spring 520 is provided between the lug 512 and the stud 513. Both ends 521 and 522 of the spring 520 are projected from the extension 511 through a pair of lugs 514 and 515 formed by bending the peripheral ends of the swing lever 510.

A slide plate 530 is slidably mounted on the base plate 160. The slide plate 530 has a step portion 530a slidably engaged with the extension 511, a pair of slits 531 and 532 engaged with studs 533 and 534 secured to the base plate 160, and a slit 537. The step portion 530a has a pair of lugs 535 and 536 formed by bending the step portion downwardly. The spring ends 521 and 522 are abutted thereon.

A disc lever 546 has a pair of pins 542 and 544 symmetrically provided on the lever at the radially opposite positions, and a shaft 545 secured at the center thereof. The pin 542 is slidably engaged with the slit 537 through a slit 171 formed in the base plate 160, and the pin 544 is slidably engaged with a slit 172 (FIG. 3) formed in the base plate. The idler gear 540 is rotatably mounted on the shaft 545. Thus the idler gear 540 is moved by the slide plate 530 in the same direction as the slide plate.

Figure 5:
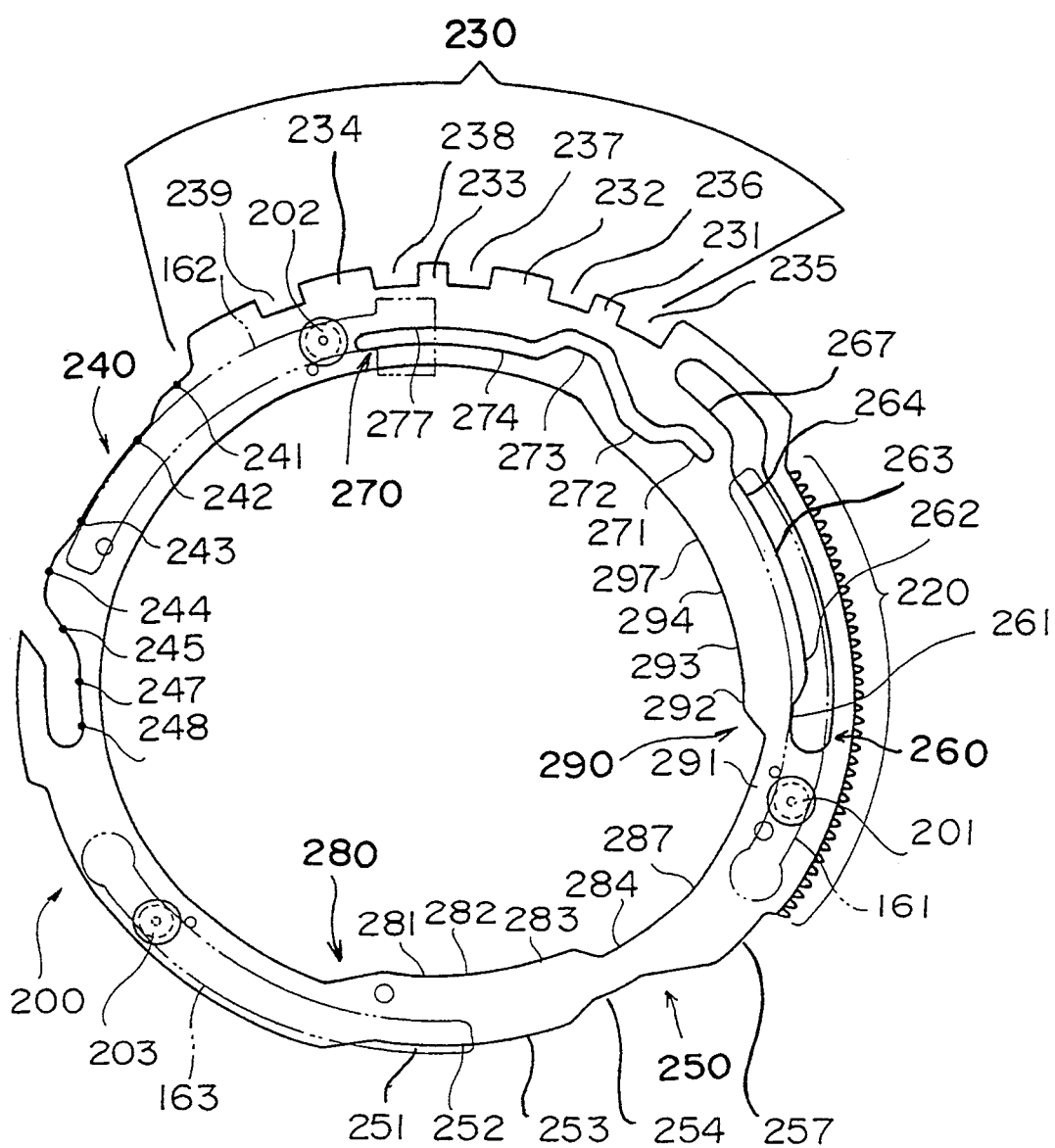
FIG. 5 is a plan view showing a mode control ring.

Referring to FIG. 5, the mode control ring 200 has three pins 201, 202 and 203 slidably engaged with arc-shaped slits 161, 162 and 163 formed on the base plate 160 as shown in FIG. 3. Thus, the ring 200 is rotatably suspended from the base plate 160.

The mode control ring 200 comprises a threaded portion 220, a notch portion 230, a head shifting cam 240, and a reverse pinch cam 250 which are formed on the outer periphery of the ring in the circumferential direction. A normal pinch cam groove 260 and a fast-forward cam groove 270 are formed in the ring. A reverse idler cam 280 and a normal idler cam 290 are formed on the inner periphery of the ring.

Figure 12:
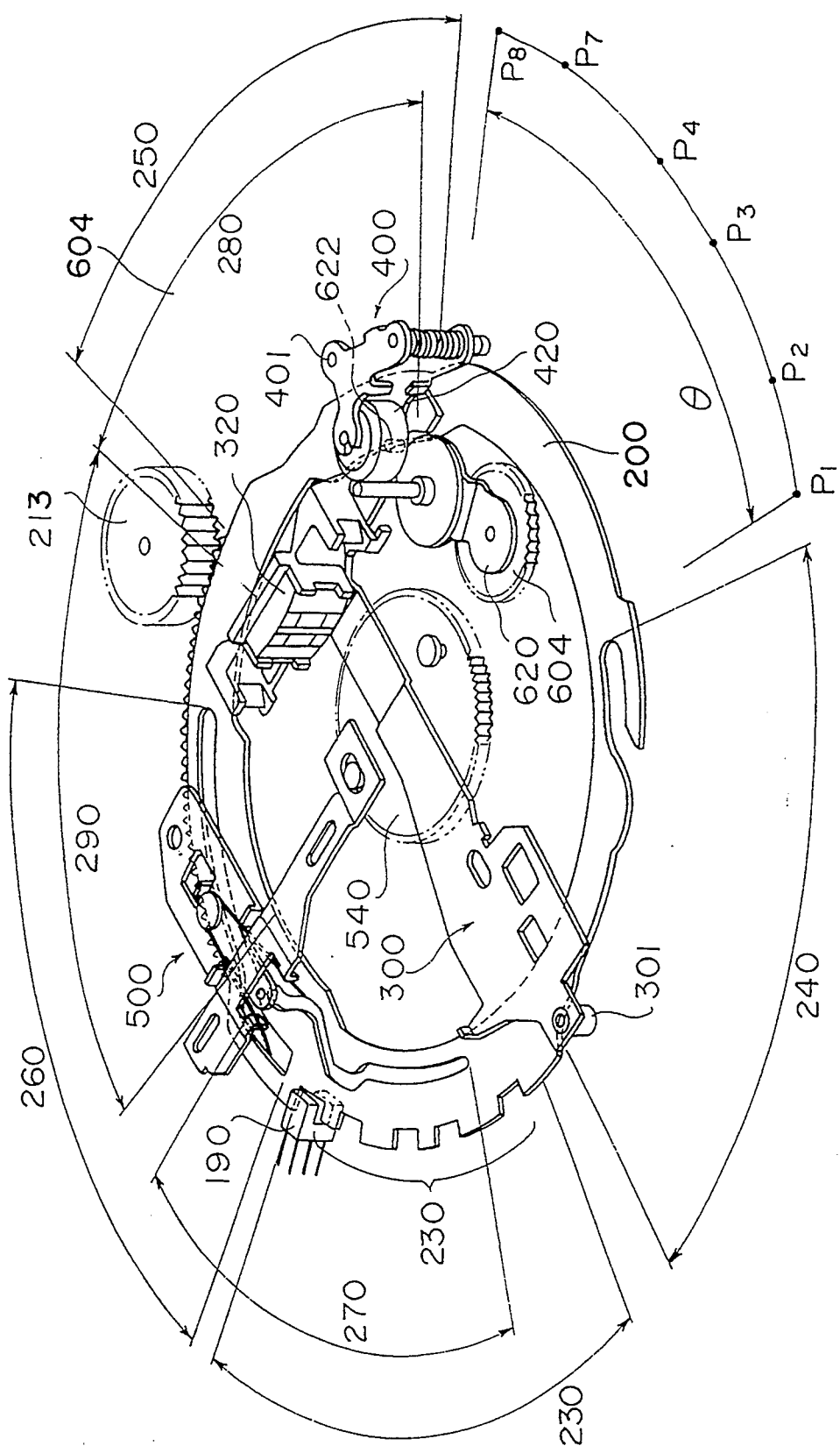
FIG. 12 is a perspective view showing a main part of the system corresponding to the mode control ring.

As shown in FIG. 12, the threaded portion 220 is engaged with the gear 213 of the gear device 210.

When the gear 213 is rotated by the motor 110 through the gear 212, the ring 200 is rotated to a predetermined angular position in accordance with the operation of the button of reproduction, fast-forward, or rewind.

Referring back to FIG. 5, notch portion 230 is provided for detecting the angular position of the mode control ring 200, and has a plurality of notches 235, 236, 237, 238 and 239 defined by a plurality of projections 231, 232, 233 and 234. The notches are positioned according to the operating modes. In order to detect the position of the notch, a position detector 190 (FIG. 3) comprising a photo-sensor is provided on the base plate 160. As shown in FIG. 3, the position sensor 190 is exposed in an opening 164 formed in the base plate. A beam radiated from the detector 190 through the opening 164 is reflected by the projections and transmitted through the notch. Thus, angular position of the ring 200 is detected.

When a normal play mode is set, the notch 235 is positioned at the sensor 190. When a rewind mode is provided, the notch 236 is positioned at the sensor. When a fast-forward mode is set, the notch 237 is detected. By the notch 238, a reverse play mode is detected. By the notch 239, a release mode is detected.

The head shifting cam 240 is provided for shifting the head 320 to a selected position. The cam 240 has cam portions 241 to 248 to be engaged with the pin 301 (FIG. 6) of the head moving device 300 for changing the position of the head 320. The cam portion 241 corresponds to the normal play mode. The cam portion 242 corresponds to the rewind mode, the cam portion 243 corresponds to the fast-forward mode, and the cam portion 244 corresponds to the reverse play mode. The cam portion 245 acts to move the head. The cam portion 247 corresponds to the release mode. The cam portion 248 acts to eject the cassette. As shown in FIG. 6, the pin 301 is slidably engaged with the cam portions through an opening 165 formed in the base plate 160. The head 302 of the pin is abutted on the underside of the ring.

The reverse pinch cam 250 is provided for shifting the reverse pinch roller 420. The cam 250 is engaged with the pin 401 (FIG. 8) of the reverse pinch device 400 for moving the levers 410. The cam 250 has a normal play mode cam portion 251, a rewind mode cam portion 252, a fast-forward mode cam portion 253, a reverse play mode cam portion 254, and a release mode cam portion 257. The cam portion 254 is indented in the radial direction. The other cam portions are positioned on the same radial positions of the ring 200. As shown in FIG. 8, the pin 401 is slidably engaged with the cam portions through an opening 168 formed in the base plate 160 (FIG. 3). The head 402 of the pin is engaged with the underside of the ring.

When the pin 401 is engaged with the cam portion 254, the swing levers 410 are rotated about the shaft 411.

The normal pinch cam groove 260 is provided for shifting the normal pinch roller 470. The cam groove 260 is engaged with the pin 451 (FIG. 9) of the normal pinch device 450. The cam groove 260 has a normal play mode cam portion 261, a rewind mode cam portion 262, a fast-forward mode cam portion 263, reverse play mode cam portion 264, and a release mode cam portion 267. The cam portion 261 is positioned at an inner radial position and the cam portion 267 is positioned at an outer radial position of the ring. The pin 451 is engaged with the cam groove 260 through an opening 169 of the base plate 160 as shown in FIG. 3.

The cam groove 270 is provided for the fast-forward device. The pin 501 (FIG. 9) of the idler gear moving device 500 is engaged with the cam groove 270 for moving the extension 511 to slide the slide plate 530. The cam groove 270 is provided with a normal play mode cam portion 271, a rewind mode cam portion 272, a fast-forward mode cam portion 273, reverse play mode cam portion 274, and a release mode cam portion 277. The cam portion 272 is positioned at an inner position and the cam portion 273 is positioned at an outer position of the ring. As shown in FIG. 9, the pin 501 is slidably engaged with the cam groove 270 through the slit 162 and the head 502 is engaged with the underside of the ring.

The reverse idler cam 280 is provided for operating the reverse pinch idler gear device. The cam 280 has a normal play mode cam portion 281, a rewind mode cam portion 282, a fast-forward mode cam portion 283, a reverse play mode cam portion 284, and a release mode cam portion 287. The cam portions 281 to 283 are positioned at an inner position. The pin 622 (FIG. 11) of the swing lever 620 of the capstan 600 is slidably engaged with the cam 280 for controlling the position of the idler gear 604.

The normal idler cam 290 is provided for operating the normal pinch idler gear device. The cam 290 comprises a normal play mode cam portion 291, a rewind mode cam portion 292, a fast-forward mode cam portion 293, a reverse play mode cam portion 294, and a release mode cam portion 297. The cam portion 291 is positioned at an outer position of the ring. The pin 672 (FIG. 9) of the swing lever 670 of the capstan 650 is slidably engaged with the cam 290 for controlling the position of the idler gear 654.

As shown in FIG. 12, an operating angle $\theta$ is set to 60 degrees. In the angle, a normal play position P1, a rewind position P2, a fast-forward position P3, a reverse play position P4, a release position P7, and an ejecting position P8 are determined.

When the ring 200 is rotated, the ring is moved from the position P1 to the position P8 in order. The pins 301, 401, 451, 501, 622 and 672 are slidably engaged with cams 240, 250, 260, 270, 280 and 290, respectively. Thus, the devices 300, 400, 450, 500 620 and 670 are operated to be moved to the desired positions corresponding to the operating modes.

The operations of the respective devices corresponding to the selected operating mode will be described hereinafter with reference to the respective drawings.

RELEASE MODE (FIG. 13)

When the cassette half A is not mounted in the holder 100 or a release button is operated, the ring 200 is rotated by the motor 110 and positioned at the release mode position P7 where the position detector 190 detects the notch 239. The pin 301 of the head moving device 300 is engaged with the release mode cam portion 247 of the cam 240 which is grooved inwardly in the radial direction of the ring so that the pin 301 is inwardly pushed toward the center of the ring 200. The operating plate 310 of the device 300 is moved to the right in FIG. 13 to retract the head 320 from the running portion of the tape.

The pin 401 of the normal pinch device 400 is engaged with the release mode cam portion 257 of the cam 250 and the pin 451 of the reverse pinch device 450 is engaged with the cam portion 267 of the cam groove 260. Thus, the swing levers 410 and 460 are rotated to release the pinch rollers 420 and 470 from the capstans 600 and 650 respectively.

The pin 501 of the idler moving device 500 is engaged with the release mode cam portion 277 which is an intermediate position so that the swing lever 510 is maintained in the tangential direction. Thus, the idler gear 540 is positioned in the center of the ring 200.

The pin 622 of the lever 620 is engaged with the release mode cam portion 287 of the cam 280 so that the swing lever 620 is rotated in the clockwise direction in FIG. 13. The reverse idler gear 604 engaged with the reverse gear 602 is engaged with the reverse reel gear 605 which is in turn engaged with the gear 351.

The pin 672 of the lever 670 is engaged with the release mode cam portion 297 of the cam 290. The lever 670 is rotated in the clockwise direction so that the idler gear 654 engaged with the normal gear 652 is disengaged from the normal reel gear 655.

When the power of the main motor 150 is transmitted to the pulleys 601 and 651 through the belt 612, the pulley 601 is rotated to rotate the gear 351 through the gears 602, 604 and 605. The gear 352 engaged with the gear 351 is rotated to rotate the reel gear 655 in the opposite direction to the gear 605. Thus, the tape is tensioned by the opposite rotation of the tape reel gears 605 and 655.

When ejecting the cassette from the holder 100, the ring 200 is further rotated in the clockwise direction to the ejecting position. The pin 301 is engaged with the cam portion 248. The projection 214 of the gear shaft 212 is engaged with the notch 216 of the lever 215 to lock the ring 200 in the ejecting mode.

NORMAL PLAY MODE (FIG. 14)

When the play button is pushed, the ring 200 is rotated to the normal play mode position, and the notch 235 is detected by the detector 190.

Figure 14:
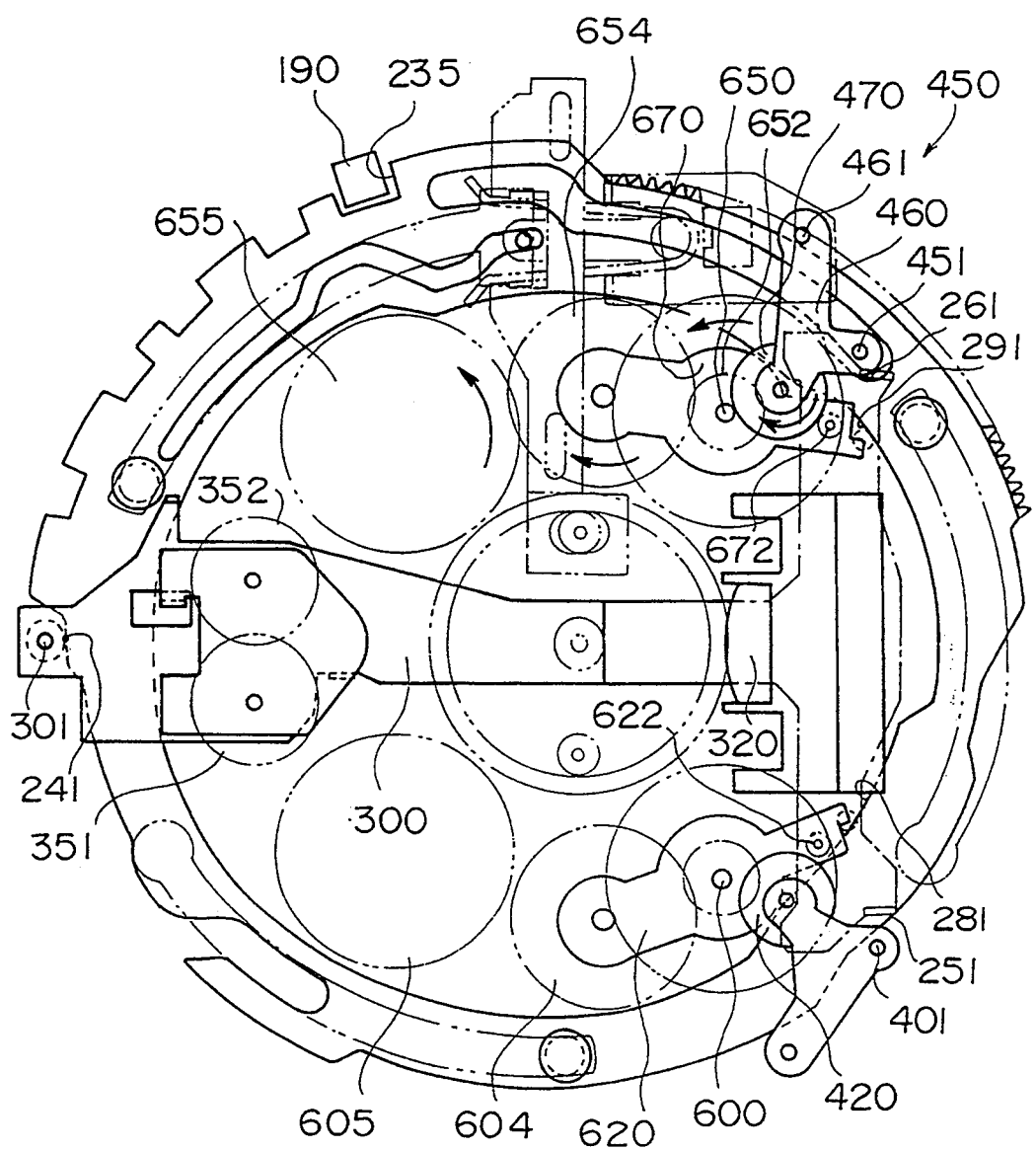
FIG. 14 shows an explanatory plan view of the main part in a normal play mode.

The pin 301 engages with the cam portion 241 which is positioned at the outer position of the ring. The head moving device 300 is moved to the left in FIG. 14 so that the head 320 engages with the running portion of the tape. The gears 351 and 352 are released from the reel gears 605 and 655, respectively. The pin 401 engages with the cam portion 251. The pin 622 engages with the cam portion 281 which is inwardly positioned so that the lever 620 is rotated in the counterclockwise direction to release the idler gear 604 from the gear 605. The pin 451 is engaged with the cam portion 261. The cam portion 261 is inwardly positioned, so that a slight gap is provided between the pin 451 and the cam portion 261. Thus, the levers 460 are in a rotatable state. The lug 332,of the plate 330 is abutted on the end 483 of the spring 480 so that the levers 460 are rotated in the clockwise direction to engage the pinch roller 470 to the capstan 650.

The pin 672 engages with the cam portion 291 which is outwardly indented compared with the intermediate position of the ring. The lever 670 is rotated in the counterclockwise direction so that the idler gear 654 engages with the reel gear 655. Thus, the gear 655 is rotated by the motor 150 through the pulley 651, gear 652 and idler gear 654. Since the gear 605 is disengaged from the idler gear 604, the gear 605 is not rotated. The tape is taken up on the takeup reel by the reel gear 655 through the capstan 650 and the pinch roller 470.

REWIND MODE (FIG. 15)

When the rewind button is pushed, the ring 200 is rotated to the rewind position, and the notch 236 is detected.

The pin 301 is engaged with the cam portion 242. The head moving device 300 is moved to the right by the difference between the positions of cam portions 242 and 241. The head 320 is slightly retracted from the tape. The pin 401 is engaged with the cam portion 252.

The pin 622 engages with the cam portion 282. Since the rewind mode cam portions 252 and 282 are positioned in the same positions as the normal play mode cam portions 251 and 281 respectively, the swing levers 410 and 620 are maintained in the same positions as FIG. 14.

The pin 451 is engaged with the cam portion 262 which is the middle position so that the lever 460 is rotated in the counterclockwise direction. The pinch roller 470 is disengaged from the capstan 650. The pin 672 engages with the cam portion 292 which is inwardly positioned so that the lever 670 is rotated in the clockwise direction to disengage the idler gear 654 from the reel gear 655.

The pin 501 is engaged with the cam portion 272 which is positioned at an inner position. The slide plate 530 is accordingly moved in the radially inward direction in FIG. 15. Consequently, the idler gear 540 is engaged with the gears 603 and 605. Thus, the reel gear 605 is rotated by the motor 150 through the rewind gear 603 and idler gear 540 at a high speed to rewind the tape at the high speed.

FAST-FORWARD MODE (FIG. 16)

The notch 237 is detected. The pin 301 is engaged with the cam portion 243 which is the same position as the cam portion 242 so that the head 320 is maintained in the same position as FIG. 15.

Figure 15:
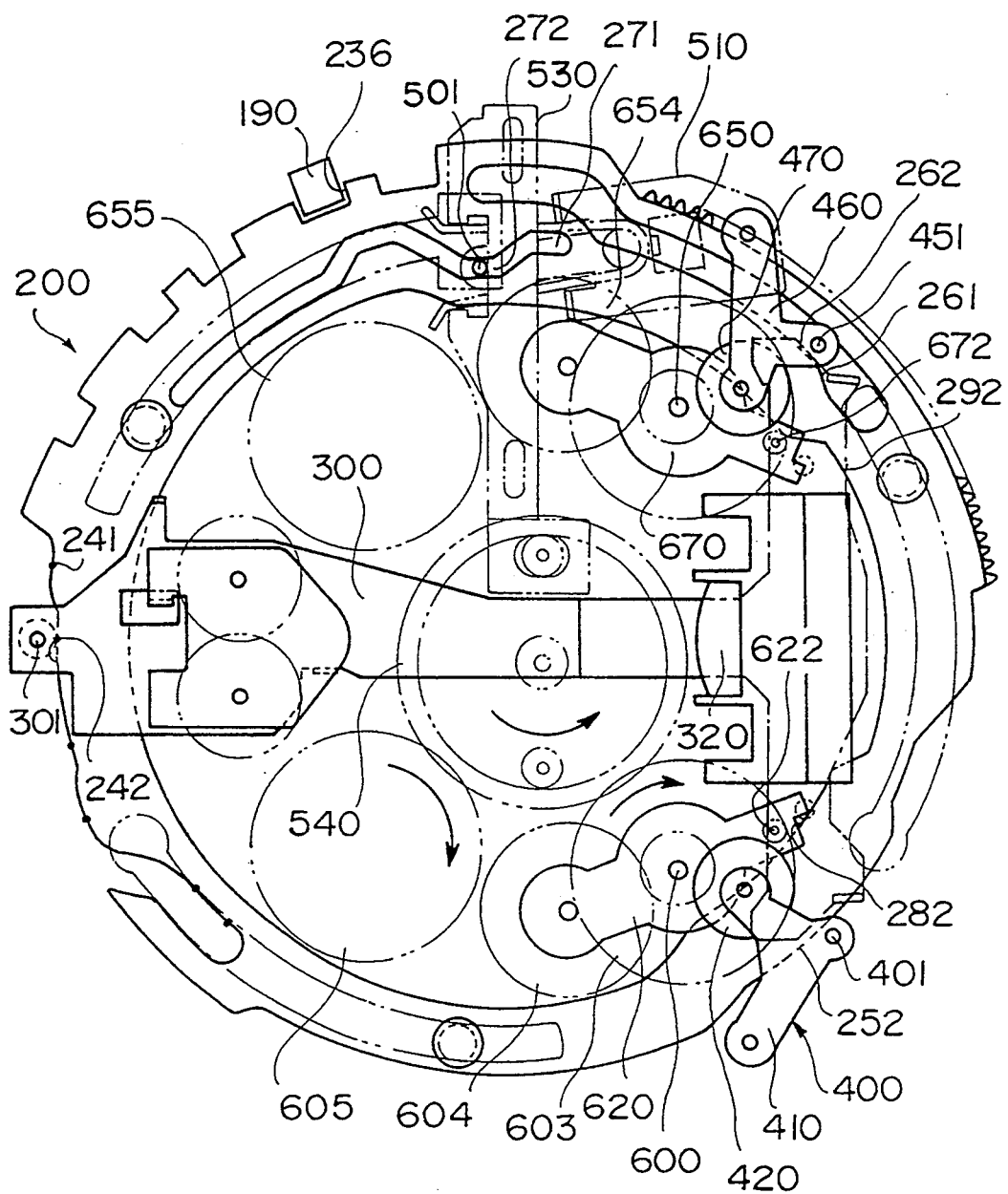
FIG. 15 shows an explanatory plan view of the main part in a rewind mode.
Figure 16:
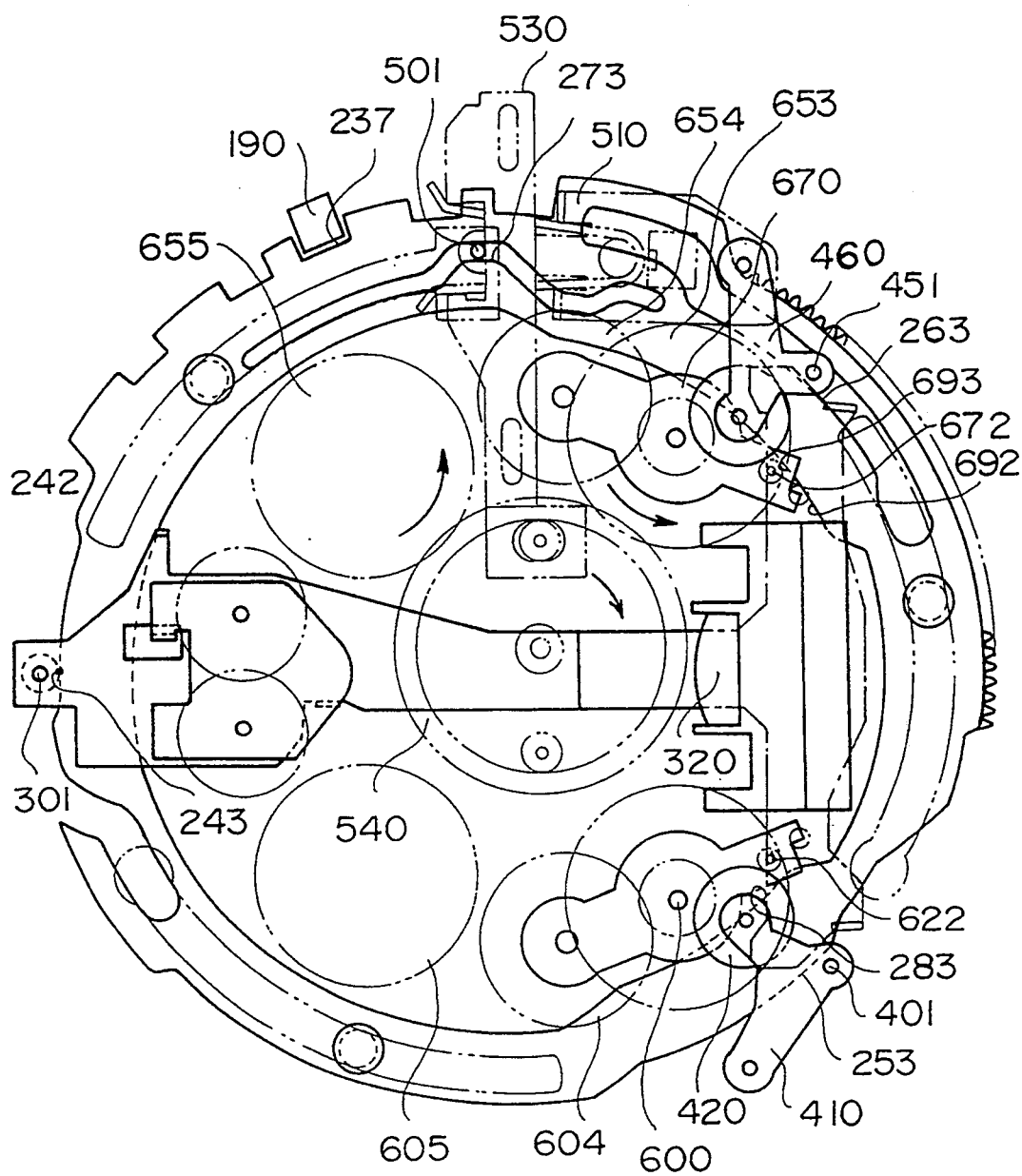
FIG. 16 shows an explanatory plan view of the main part in a fast-forward mode.
Figure 17:
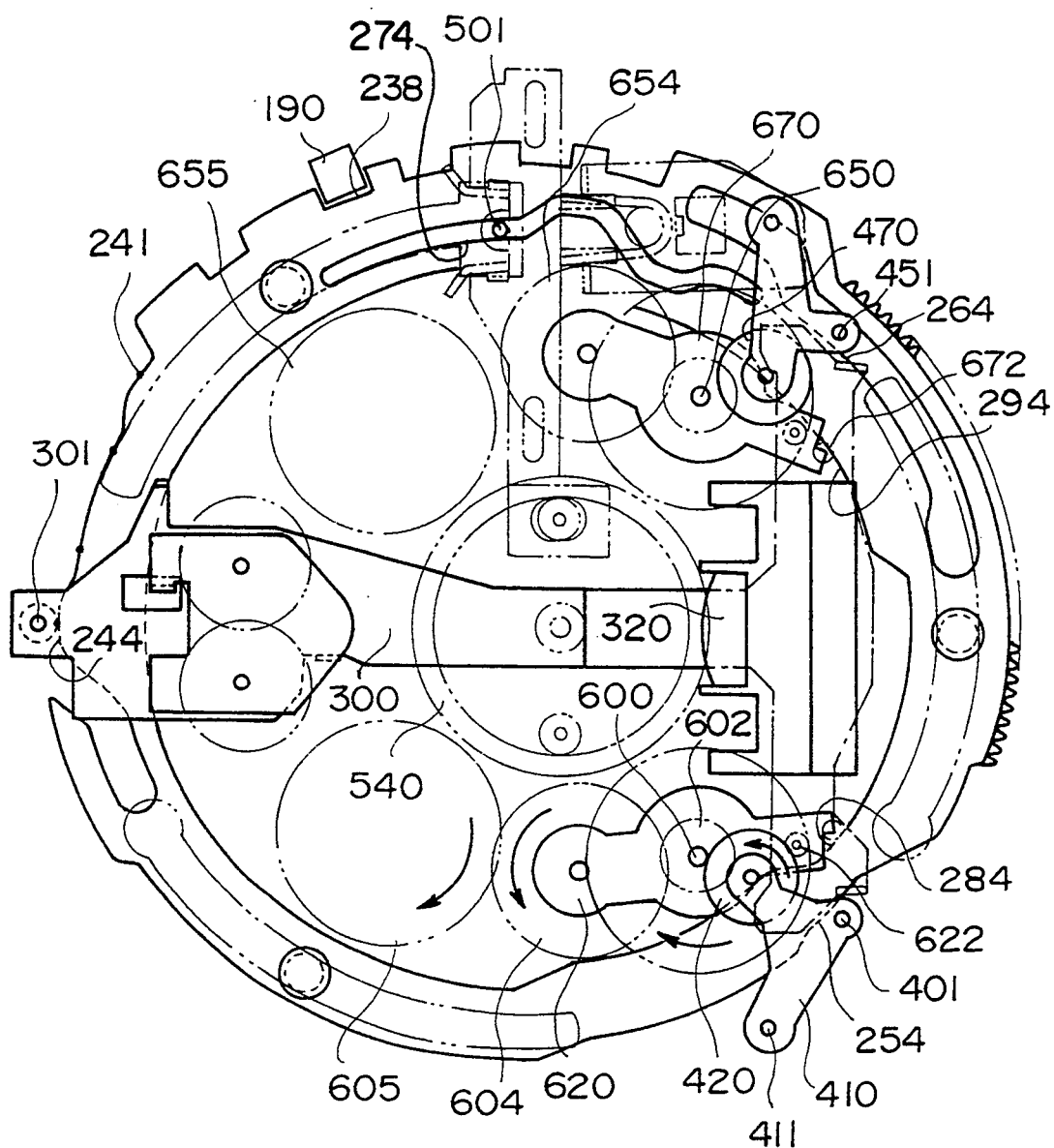
FIG. 17 shows an explanatory plan view of the main part in a reverse play mode.

In FIG. 16, the pins 401, 451, 622 and 672 are engaged with the fast-forward mode cam portions 253, 263, 283 and 293 which are the same positions as the rewind mode cam portions, so that the levers 410, 460, 620 and 670 are also maintained in the same position as FIG. 15.

The pin 501 is engaged with the cam portions 273 to move the slide plate 530 in the outward direction in FIG. 16. The idler gear 540 is engaged with the fast-forward gear 653 and the reel gear 655 to rotate the gear 655 at a high speed. Thus, the tape is fed at the high speed.

REVERSE PLAY MODE (FIG. 17)

The detector 190 detects the notch 238. The pin 301 is engaged with the cam portion 244 to move the head moving device 300 to the left. Thus, the head 320 is engaged with the tape.

The pin 401 engages with the cam portion 254 which is inwardly positioned than the intermediate position, so that the levers 410 are maintained in a rotatable state. The lug 331 of the supporting plate 330 is abutted on the spring end 433 as shown in FIG. 8. Thus, the pinch roller 420 is engaged with the capstan 600.

The pin 622 is engaged with the cam portion 284 which is outwardly positioned, so that the lever 620 is rotated by the spring 623 in the clockwise direction to engage the idler gear 604 with the reel gear 605.

The pin 451 engages with the cam portion 264 which is the intermediate position to release the pinch roller 470 from the capstan 650. The pin 672 engages with the cam portion 294 to rotate the lever 670 in the clockwise direction. Thus, the idler gear 654 is released from the reel gear 655.

The pin 501 is engaged with the cam portion 274. The idler gear 540 is moved toward the center of the ring. The power of the motor 150 is transmitted to the reel gear 605 through the reverse gear 602 and the idler gear 604.

Thus, the reproduction or recording in the reverse mode is performed.

In accordance with the present invention, a mode control ring having various cams is provided for controlling positions of the magnetic head, pinch rollers, and gear trains of normal and reverse plays, and rewind and fast-forward operations. Therefore, the system is simple in construction and it is possible to ensure the timing of each mode. Furthermore, power for moving the devices is obtained with a reasonable structure. In particular, since the elements of the system are horizontally arranged, the power transmission system is also simplified, thereby providing a compact recorder.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An apparatus for selecting an operating mode of a cassette tape recorder comprising:
    a base plate;
    a magnetic head provided on a supporting plate which is movably mounted on the base plate;
    a normal reel gear and a reverse reel gear rotatably mounted on the base plate, respectively;
    a normal pinch device mounts on the base plate and comprising a normal capstan, a normal pinch roller provided on a normal swing lever so as to be engaged with the capstan, and a normal idler gear provided to be engaged with the normal reel gear;
    a reverse pinch device mounted on the base plate and comprising a reverse capstan, a reverse pinch roller provided on a reverse swing lever so as to be engaged with the reverse capstan, and a reverse idler gear provided to be engaged with the reverse reel gear;
    a power transmitting device for transmitting a driving power from a motor to the normal capstan and reverse capstan;
    an idler gear rotatably mounted on a movable plate movably mounted on the base plate; and
    a mode control ring rotatably mounted on the base plate, the mode control ring having:
        a head shifting cam formed on an outer peripheral surface for shifting the support plate to move the magnetic head between a head operative position against a tape and a head inoperative position away from the tape;
        a normal pinch cam formed as a circumferential groove for shifting the normal swing lever so as to engage the normal pinch roller with the normal capstan;
        a reverse pinch cam formed on an outer peripheral surface for shifting the reverse swing lever so as to engage the reverse pinch roller with the reverse capstan;
        a normal idler cam formed on an inner peripheral surface for engaging the normal idler gear with the normal reel gear to drive it for normal playing;
        a reverse idler cam formed on an inner peripheral surface for engaging the reverse idler gear with the reverse reel gear to drive it for reverse playing; and
        a fast-forward cam formed as a circumferential groove for shifting the movable plate so as to selectively engage the idler gear with one of the normal reel gear and the reverse reel gear.

2. The apparatus according to claim 1 wherein the normal pinch device and reverse pinch device are mounted at positions along the circumference of the mode control ring adjacent said normal pitch cam and said reverse pitch cam respectively.

3. The apparatus according to claim 1 wherein the supporting plate, normal swing lever, reverse swing lever, and movable plate are arranged so as to be moved in radial directions of the mode control ring by respective cams.

4. The apparatus according to claim 1 wherein the magnetic head, normal pinch device, and reverse pinch device are disposed in a sector of the mode control ring at one side thereof and the power transmission device is disposed on the other side of the mode control ring radially opposite said sector.

* * * * *